(12) United States Patent
Brancaleoni et al.

(10) Patent No.: US 9,027,546 B2
(45) Date of Patent: May 12, 2015

(54) IMPROVEMENTS FOR SOLAR COLLECTOR RECEIVER TUBES

(71) Applicant: SAES Getters S.p.A., Lainate (IT)

(72) Inventors: Mauro Brancaleoni, Paderno Dugnano (IT); Andrea Conte, Milan (IT); Franco Veronelli, Lainate (IT)

(73) Assignee: SAES Getters S.p.A., Lainate (IT)

( * ) Notice: Subject to any disclaimer, the term of this patent is extended or adjusted under 35 U.S.C. 154(b) by 0 days.

(21) Appl. No.: 14/366,259

(22) PCT Filed: Jan. 23, 2013

(86) PCT No.: PCT/IB2013/050575
§ 371 (c)(1),
(2) Date: Jun. 17, 2014

(87) PCT Pub. No.: WO2013/114251
PCT Pub. Date: Aug. 8, 2013

(65) Prior Publication Data
US 2014/0360488 A1 Dec. 11, 2014

(30) Foreign Application Priority Data
Feb. 3, 2012 (IT) .............................. MI2012A0144

(51) Int. Cl.
*F24J 2/46* (2006.01)
*F24J 2/07* (2006.01)
(Continued)

(52) U.S. Cl.
CPC .......... *F24J 2/4616* (2013.01); *Y10T 29/49355* (2015.01); *F24J 2/07* (2013.01); *H01J 7/186* (2013.01); *Y02E 10/41* (2013.01); *F24J 2/055* (2013.01)

(58) Field of Classification Search
CPC ............. F24J 2/4616; F24J 2/055; F24J 2/07; F24J 2002/5275; B01D 49/00; H01J 7/186; H01J 7/18; H01J 11/52; H01J 17/24; H01J 19/70; B65D 73/0064; B65D 5/5028; B65D 5/38; B65D 73/0014; A47F 7/0043; A45C 11/24
USPC ............... 126/653, 634, 676, 617; 60/641.13, 60/641.15; 96/121, 134; 206/477, 461, 206/465, 464, 468
See application file for complete search history.

(56) References Cited

U.S. PATENT DOCUMENTS

| | | | |
|---|---|---|---|
| 3,203,901 | A | 8/1965 | Della Porta |
| 3,225,910 | A | 12/1965 | Della Porta |

(Continued)

FOREIGN PATENT DOCUMENTS

| | | |
|---|---|---|
| EP | 2325575 | 5/2011 |
| GB | 2077487 | 12/1981 |

(Continued)

OTHER PUBLICATIONS

PCT International Search Report issued on Sep. 27, 2013 for PCT/IB2013/050575 filed on Jan. 23, 2013 in the name of Saes Getters S.p.A.

(Continued)

*Primary Examiner* — Gregory Huson
*Assistant Examiner* — Daniel E Namay
(74) *Attorney, Agent, or Firm* — Steinfl & Bruno LLP (57) ABSTRACT

A solar collector receiver tube containing an improved getter system is described. The solar collector receiver tube has a base, pills of getter material that are uniform in height, and a containment metallic mesh having a non-uniform height and presenting at least one depression.

8 Claims, 5 Drawing Sheets

(51) Int. Cl.
 *F24J 2/05* (2006.01)
 *F24J 2/50* (2006.01)
 *H01J 7/18* (2006.01)

(56) References Cited

U.S. PATENT DOCUMENTS

| | | | |
|---|---|---|---|
| 4,127,361 A * | 11/1978 | Hellier et al. | 417/48 |
| 4,306,887 A | 12/1981 | Barosi et al. | |
| 5,961,750 A | 10/1999 | Boffito et al. | |
| 6,472,819 B2 * | 10/2002 | Carretti et al. | 313/562 |
| 6,508,632 B1 * | 1/2003 | Conte et al. | 417/48 |
| 6,793,713 B2 * | 9/2004 | Kretsinger et al. | 95/117 |
| 6,832,608 B2 | 12/2004 | Barkai et al. | |
| 6,838,822 B2 * | 1/2005 | Yonezawa et al. | 313/562 |
| 6,858,984 B2 * | 2/2005 | Yamashita | 313/553 |
| 7,397,185 B2 * | 7/2008 | Yonezawa et al. | 313/549 |
| 7,645,327 B2 * | 1/2010 | Pfeffer et al. | 96/108 |
| 8,815,115 B2 * | 8/2014 | Coda et al. | 252/181 |
| 2002/0008469 A1 * | 1/2002 | Carretti et al. | 313/562 |
| 2003/0145726 A1 * | 8/2003 | Gueret et al. | 95/96 |
| 2005/0062415 A1 * | 3/2005 | Yonezawa et al. | 313/553 |
| 2006/0042748 A1 * | 3/2006 | Hasegawa et al. | 156/285 |
| 2009/0215610 A1 * | 8/2009 | Kullberg et al. | 502/56 |
| 2012/0020862 A1 * | 1/2012 | Coda et al. | 423/248 |
| 2012/0247456 A1 * | 10/2012 | Martinez Sanz et al. | 126/653 |
| 2013/0025585 A1 * | 1/2013 | Conte et al. | 126/651 |
| 2013/0125874 A1 * | 5/2013 | Conte et al. | 126/653 |
| 2014/0158113 A1 * | 6/2014 | Urbano et al. | 126/653 |

FOREIGN PATENT DOCUMENTS

| | | | | |
|---|---|---|---|---|
| GB | 2089023 A * | 6/1982 | | F24J 3/02 |
| JP | 54046185 A * | 4/1979 | | B01D 15/00 |
| JP | 58049857 A * | 3/1983 | | F24J 3/02 |
| JP | 2005185951 A * | 7/2005 | | B01J 20/20 |
| WO | 2007/099575 | 9/2007 | | |
| WO | 2007/148362 | 12/2007 | | |
| WO | 2010/105945 | 9/2010 | | |
| WO | 2012/016865 | 2/2012 | | |

OTHER PUBLICATIONS

PCT Written Opinion issued on Sep. 27, 2013 for PCT/IB2013/050575 filed on Jan. 23, 2013 in the name of Saes Getters S.p.A.

\* cited by examiner

IMPROVEMENTS FOR SOLAR COLLECTOR RECEIVER TUBES

CROSS REFERENCE TO RELATED APPLICATIONS

The present application is the US national stage of International Patent Application PCT/IB2013/050575 filed on Jan. 23, 2013 which, in turn, claims priority to Italian Patent Application MI2012A000144 filed on Feb. 3, 2012.

The present invention refers to improvements for solar collector receiver tubes.

Solar collectors are becoming an alternative energy source of increasing relevance. In these devices, and more specifically in the receiver tubes of solar collectors the presence of hydrogen is noxious since it increases the heat conduction from the central tubular body, where a heat removal fluid flows, toward the outside of the receiver tube, therefore progressively decreasing its efficiency. In this case the problems linked to the presence of hydrogen are of particular relevance since the fluid flowing in the central body tends to decompose at high temperatures generating hydrogen.

Also in the receiver tubes of the new generations, that employ a different fluid type for the heat removal at higher temperatures, the problem related to the presence of hydrogen and the consequential decay in the device characteristics is of particular relevance since at such higher temperatures there is a higher hydrogen outgassing from the metallic parts of the receiver.

Within the receiver tubes there is also an additional problem related to the high internal temperatures, that bring the getter material into unfavorable working conditions with reference to the hydrogen capacity, that is inversely proportional to the operating temperature.

For this reason some technical expedients have been developed, such as the one disclosed in U.S. Pat. No. 6,832,608, that describes an arrangement, in the form of a sledge (also commonly indicated in the field with the term "bridge"), in order to position and efficiently house the getter material within the receiver tube, with the purpose of shielding the getter material from the solar radiation and the portions of the collector that reach the highest temperature.

This type of arrangement has some drawbacks, since typically the getter material is employed in the form of pills of compressed powders having a standard size, i.e. with a 10 mm diameter, which implies that in order to be able to introduce into the receiver tube the sufficient amount of getter material, to ensure proper device operation for 20-30 years, every sledge shall house two lines of pills, and typically in each receiver tube two sledges are accommodated.

This causes two problems of different natures on one side a greater difficulty in the loading of the getter material, in the form of two lines of getter pills adjacent to each other, and on the other side in a higher number of contact points of the pills, that are in contact with each other and with the sledge walls.

These contact points create some preferential brittleness regions with consequent powder generation. The generation and consequent detachment of powders from the pills is a phenomenon to be reduced as much as possible, even when those powders are confined by means of suitable containment metallic meshes. These detached powders create problems not only of an aesthetic nature, but also of a functional nature (for example degrading the transparency of the surface exposed to radiation and consequently the thermal efficiency of the receiver tube).

These problems were already addressed in WO 2012/016865 in the applicant's name, which teaches to minimize them by placing pills of suitable size in a single line in a sledge that optionally includes, as further improvements, pills restraining elements such as elastic elements.

The purpose of the present invention is to reduce the intensity of the powder generation phenomenon and to achieve further improvements with respect to the arrangement known in the art, and in a first aspect thereof it consists in a solar collector receiver tube containing one or more getter systems comprising a base, pills of getter materials arranged on said base in one or more lines, and a containment metallic mesh fixed onto the base and enclosing the getter pills, wherein said getter pills are uniform in height and comprised between 1 and 10 mm, said containment metallic mesh has a non-uniform height and presents at least one depression defined by a minimum and a maximum height of the metallic containment mesh, the minimum height of the metallic containment mesh being equal to the height of the getter pills and its maximum height being comprised between 1.05 and 2 times the height of the getter pills.

Preferably the uniform height of the getter pills in the getter system is comprised between 2 and 6 mm, and the maximum height of the enclosing mesh, surrounding and therefore containing the getter pills into the getter system, is comprised between 1.2 and 1.5 times the height of the getter pills.

It is to be underlined that the above geometrical definition for the getter system and its components, with particular reference to the containment metallic mesh, refers to the system once assembled. In fact it is particularly useful to employ a pre-formed containment metallic mesh that presents a minimum height lower than the height of the getter pills to be used in the getter system, the metallic mesh elasticity allowing for its successful and useful use and providing advantages in terms of better retention of the getter pills within the getter system assembly.

The expression "the getter pills are uniform in height" means that the getter pills height may be minimally different from pill to pill, typically for few tenths of mm, due to variability of the getter pills manufacturing process, that typically consists in pressing the getter powders in a suitable mold.

In an even more preferred embodiment, the getter pills within the getter system have a diameter comprised between 15 and 35 mm and their diameter/height ratio is comprised between 2 and 8. With such dimensional features for the pills it is possible to use a single getter system to ensure the appropriate lifetime to a solar collector receiver tube.

The present invention will be illustrated in the following with the help of the following figures, wherein.

In the figures the dimensions and the dimensional ratios of the elements, with particular yet non-exclusive reference to the dimensions of the getter pills and base thickness, are not correct but have been altered in order to improve the comprehension of the graphical representation of the invention.

With the present invention, assembling the getter system is much easier thanks to the shape of the metallic containment mesh that acts also as an elastic restraining element of the getter system. This is particularly advantageous when the getter pills are pre-loaded in the pre-formed metallic mesh, which is one possibility to assemble the getter system.

Moreover, with the present invention there are further advantages when the getter system contains getter pills with increased surface that provide an improved performance in terms of less powder generation over time. Although the use of this type of pills is generally unadvisable for the powder generation aspect (since the pills are more fragile), the use of this type of getter pills is particularly beneficial in solar collector receiver tubes since it allows to use only one getter system per receiver tube or to use getter systems containing just one line of getter pills, accounting for less space taken by the getter system within the receiver tube.

It is to be remarked that the pills surface increase, while keeping the same height, renders them more fragile and consequently more difficult to handle, but, on the other side, the height increase results in a negative effect on the pumping speed and in the difficulties that gaseous impurities encounter in reaching the inner pill regions. Therefore the detrimental effects to be expected in adopting pills with an enlarged diameter would have not prompted a person skilled in the art to adopt such a solution. Also it is to be underlined that the getter pills to be used in the present invention are obtained only by a suitable compression of the powders of the getter materials and do not comprise binders, that would otherwise affect the capacity of the material intended as amount of hydrogen adsorbed by each pill. This is a fundamental aspect that affects the pill structure resistance and the associated constraints for its successful employment in the solar collector application.

In view of the above described opposite phenomena, the optimal ratio between the pills diameter and their height is comprised between 2 and 8, and for the very same reasons problems start to manifest for pills with a diameter bigger than 35 mm.

Preferably the pills diameter is comprised between 18 and 25 mm and the ratio between their diameter and their height is comprised between 3 and 6. By operating with a getter system loaded with pills having such dimensional characteristics, it is possible to insert into the receiver tube a sufficient amount of getter material, capable to guarantee a device lifetime of 20-30 years, by using only one system per receiver tube. On the contrary, many of the arrangements currently employed envision the use of two distinct systems for each receiver tube, with the associated positioning and fixing problems, in addition to the structural costs that include not only the base but also the elements that complete the mechanical support, i.e. the confinement metallic mesh, spacers and suitable heat shields.

So as outlined, the major hurdle in using getter pills with this geometrical feature is an increased fragility, that becomes even more critical with the ageing of the getter system.

The technical problem of minimizing the powder generation is addressed by the present invention through the use of a getter system whose boundaries are given by a metallic base and by a containment metallic mesh that presents at least one depression with a minimum height corresponding to the height of the getter pills inserted therein, while the maximum height of the containment mesh is comprised between 1.05 and 2 times the height of the getter pills.

With the geometrical constraints posed and determined by the getter pills height, this ensures that a preformed metallic mesh preserves the shape that is it given and also exhibits a good degree of elasticity, providing various advantages.

In the first place, it is easier to assemble the getter system by simply placing the getter pills onto the base in their correct and desired position and then "capping" them with the preformed metallic mesh, or alternatively to pre-load a preformed containment metallic mesh with the getter pills and then join the metallic mesh to the base.

Secondly the system, even though being rigid and maintaining the given shape, since it comprises an elastic element (the containment metallic mesh) allows for a certain degree of deformation driven by the getter pills, by varying some geometrical features of the depression (i.e. the minimal height) while maintaining the given shape outline.

This allows for easier assembling of the getter system and also accommodates the dimensional variations of the pills, due to the pill swelling (consequent to $H_2$ sorption). In turn, this reduces the pressure and forces exerted on the getter pills surfaces in the contact points of the getter pills with the metallic mesh, that represent the upper and lateral boundaries of the getter system.

In the third place, this arrangement does not need specific elastic elements to prevent undesired movements, collisions and contacts between the pills, since the depression of the containment mesh ensures a sufficient restraint, also taking into account that the pills are more fragile when they have started to swell as a consequence of $H_2$ sorption and therefore the mesh depression, exerting a gentle compression onto the pill surface, achieves the effect of efficiently restraining the pills movement.

This effect is of particular relevance both in single and in multiple line getter systems. In case of single line pills of larger dimensions, the pills are more fragile and a non-rigid restraining on three sides of the getter system by the metallic mesh avoids to the maximum extent the breaking of the pill structure and the consequent sharp rise in powder generation. In case of a plurality of getter pills lines, it prevents undesired contacts between the pills, contacts that may lead to fractures and stresses with consequent powder generation increase.

With the getter system for receiver tubes of solar collectors according to the present invention there is no need to use elastic elements between the getter pills, such as described in a preferred embodiment disclosed in the above-mentioned application WO 2012/016865. This allows to insert more getter pills into the getter system, thus increasing its overall capacity toward $H_2$, or alternatively to have a shorter system. Both aspects are relevant in a receiver tube where the space to insert components such as the getter system is limited, taking into account also the fact that the suitable regions for its placing are limited due to thermal constraints (it should avoid the portion at the highest temperature of the receiver tube, where the $H_2$ capacity of the getter material would be reduced).

Further advantages are obtained when the maximum height of the containment mesh is comprised between 1.2 and 1.5 times the height of the getter pills, since in this case the containment mesh tends to better maintain its shape, making easier to assemble the getter system.

Figure 1A:
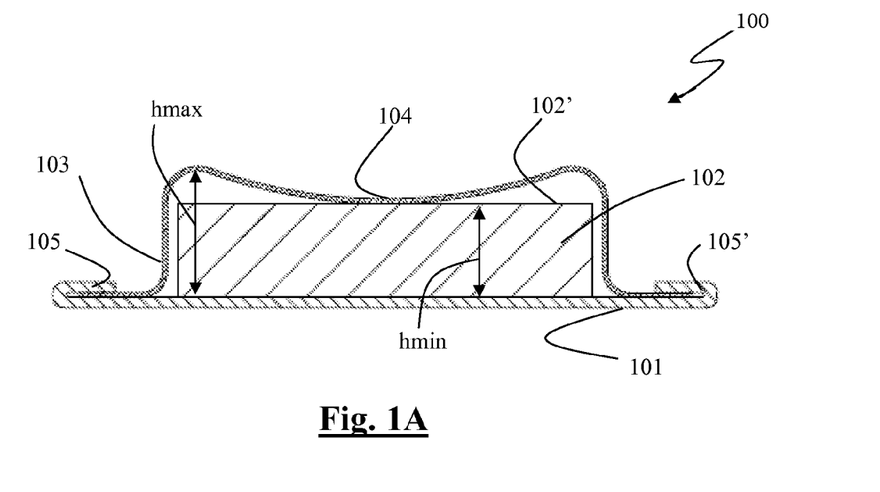
FIGS. 1A and 1B show cross-sections of receiver tubes getter systems according to the present invention.
Figure 1B:
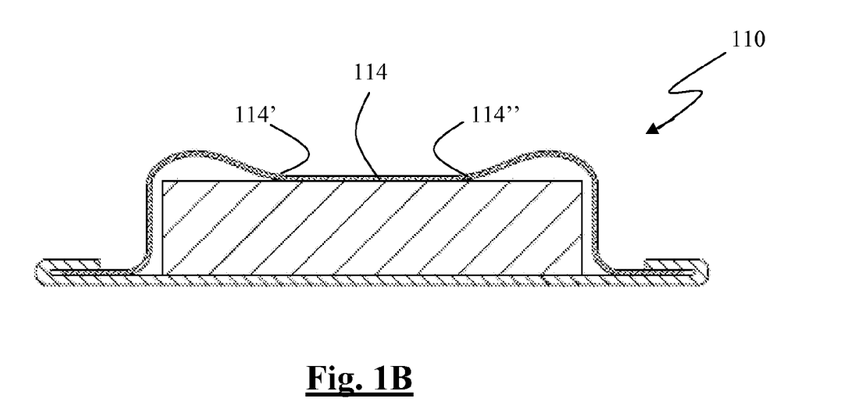

The cross-sections of the first two embodiments of receiver tubes getter systems according to the present invention are shown in FIG. 1A and FIG. 1B.

FIG. 1A shows a getter system 100 that comprises a base 101, on which there is disposed a getter pill 102 having a height corresponding to the minimum height of the getter system hmin. The getter pill 102 is surrounded by a metallic mesh 103, having a maximum height hmax corresponding to the maximum height of the getter system, said mesh 103 contacting the top surface 102' of the pill in a limited contact area in correspondence to a mesh depression 104. The base 101 also has two folded portions 105, 105' that keep the metallic mesh 103 firmly in position.

FIG. 1B shows a similar getter system 110, but in this case the contact area between the upper surface of the getter pill and the metallic mesh is wider and its extremities are indicated by reference numerals 114' and 114" that represent the boundaries of a depression 114 of the metallic mesh.

Figure 2A:
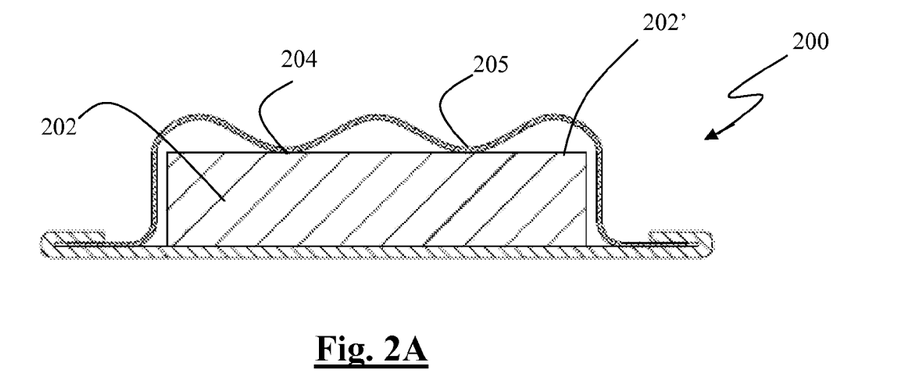
FIGS. 2A and 2B show cross-sections of other alternate embodiments of receiver tubes getter systems according to the present invention.
Figure 2B:
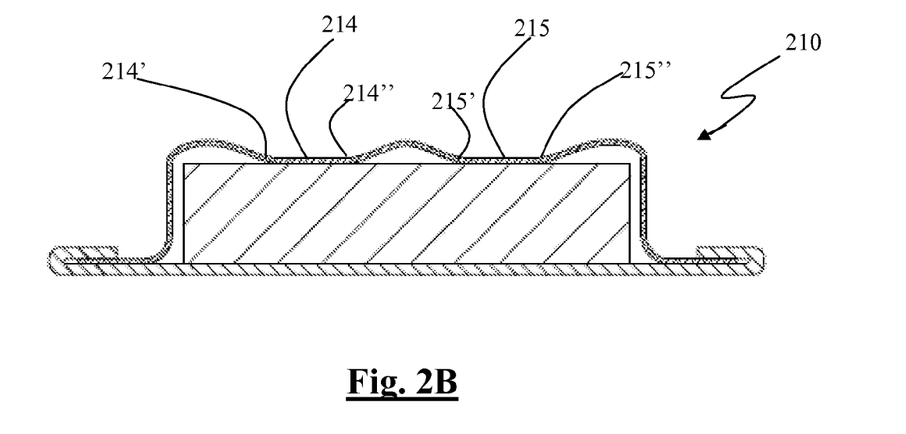

Cross-sections of alternate embodiments of receiver tubes getter systems according to the present invention are shown in FIG. 2A and FIG. 2B. In FIG. 2A there is shown a getter system 200 whose containment metallic mesh presents two depressions 204 and 205 and exhibits a limited contact area between the metallic mesh and the top surface 202' of the getter pill 202.

FIG. 2B shows a getter system 210 whose containment metallic mesh presents two depressions 214 and 215 but in this case the contact area between the top surface of the getter pill and the metallic mesh is wider and its boundaries are represented respectively by reference numerals 214', 214" and 215', 215".

In all the previous figures the metallic mesh is firmly fixed onto the base by means of a folded portion of the base itself. This is just one of many possible ways to fix the mesh to the base. Another equivalent means is for example spot welding. In this case the most useful configuration is for the metallic mesh to be longer than the base width and to be welded onto the lower surface of the base. In this case in a preferred embodiment the mesh partly overlaps so that with just one welding operation in the overlapping region the system is "closed" and the metallic mesh firmly attached to the base.

Once again, it is to be underlined that the above figures and geometrical features of the getter system refer to the getter system once its three main constituents are assembled (base, getter pills, metallic containment mesh), and its final features and characteristics are independent of how it is assembled. For example, whether the pills are arranged on the base and then the metallic mesh, preferably preformed, closes it, or if the pills are pre-loaded in a pre-formed metallic mesh and then this sub-assembly is joined to the base.

Figure 3A:
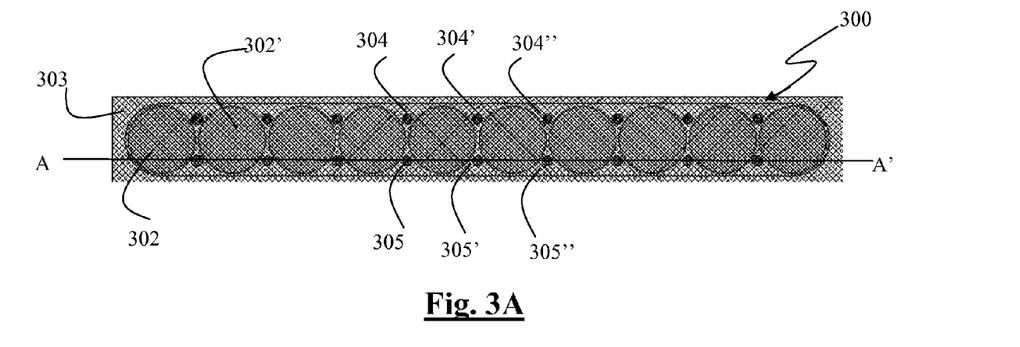
FIG. 3A shows a top view of a receiver tubes getter system according to the present invention and FIG. 3B shows a sectional view taken along line A-A' of FIG. 3A.

FIG. 3A shows a top view of a getter system 300 according to the present invention. In this case the getter pills 302, 302', . . . are arranged on the base (not represented) in a single line, and between each pair of adjacent pill there are two protrusions 304-305, 304'-305', 304"-305", . . . that help in putting the pills in the correct position during the manufacturing of the getter system. These protrusions can be simply made by punching the opposite side of the base of the getter system. In the top view the base is not clearly visible since it is covered by the mesh, and also the mesh depression is not represented, but it is useful anyway to represent the base protrusions to put more emphasis on the role of these elements.

Figure 3B:
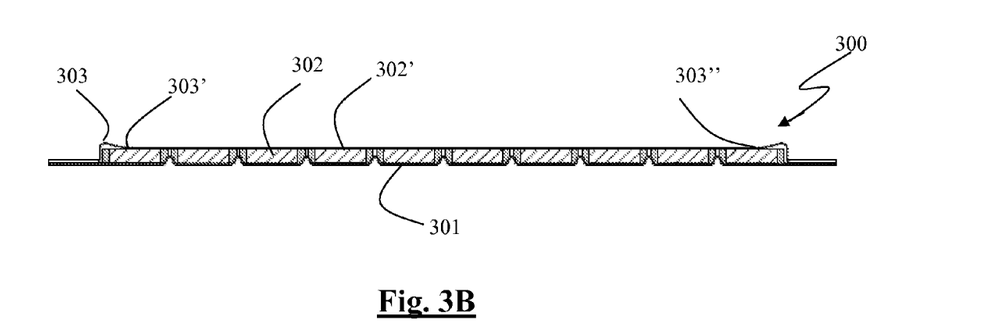

The base and the mesh depression are instead clearly represented in the longitudinal cross-section of FIG. 3B taken along line A-A', showing the base as element 301, and the depression boundaries of the containment metallic mesh 303, indicated by reference numerals 303', 303". In this case the depression runs over the entire line of pills, but as previously described there may be a plurality of depressions, one in correspondence of each pill. In FIG. 3B the grey portion of getter pills 302, 302', . . . indicates the part of the getter pill that is beyond the protrusions since, as shown in FIG. 3A, the distance between the protrusions 304 and 305 is less than the getter pills diameter.

Figure 4A:
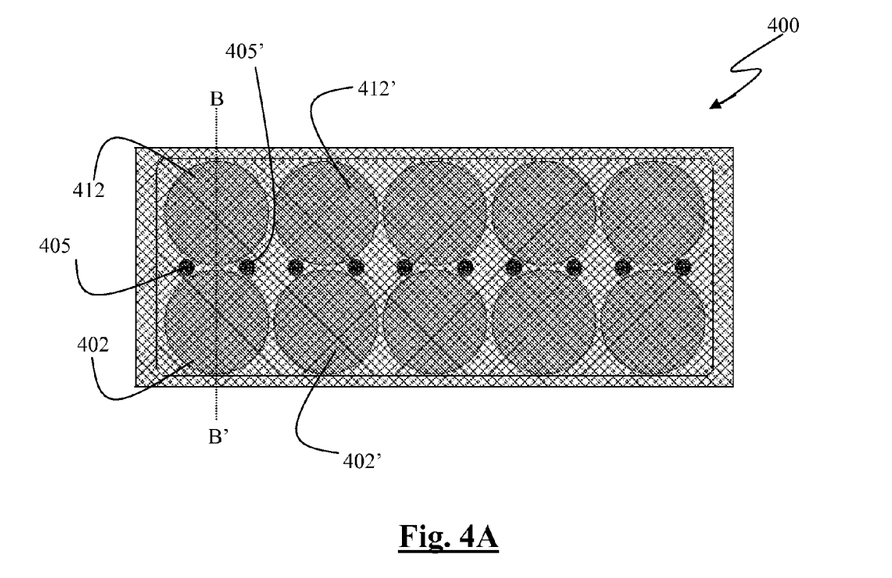
FIG. 4A shows a top view of an alternate embodiment of a receiver tubes getter system according to the present invention and FIGS. 4B and 4C show two possible cross-sectional views taken along line B-B' of FIG. 4A.
Figure 4B:
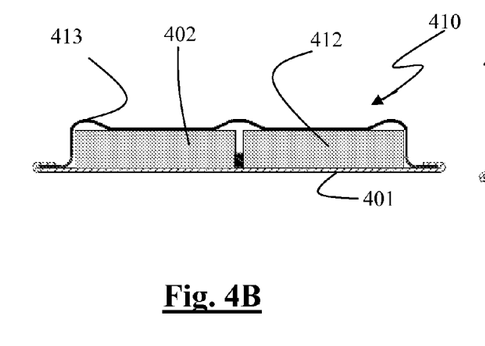
Figure 4C:
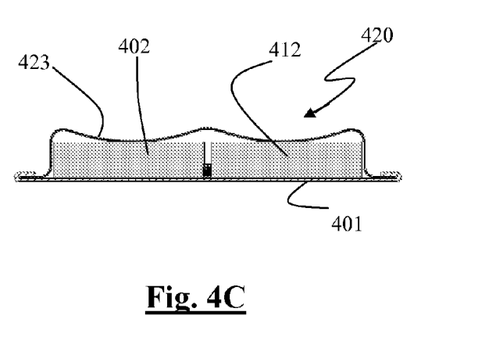

FIG. 4A, shows a top view of a getter system 400 containing two lines of getter pills, 402, 402', . . . and 412, 412', . . . held by a metallic containment mesh. The getter pills spacing is assisted by protrusions 405, 405', . . . and two possible cross-sections taken along line B-B' are shown in FIGS. 4B and 4C, The getter systems 410 and 420 represented therein both have containment metallic meshes indicated respectively by reference numerals 413 and 423 with two depressions, the system of FIG. 4B having a wider contact area between the top surface of the two getter pills 402, 412 and the metallic containment mesh 413. In both cases the containment metallic mesh is fixed onto base 401 by means of a folded portion of the base itself.

Figure 5:
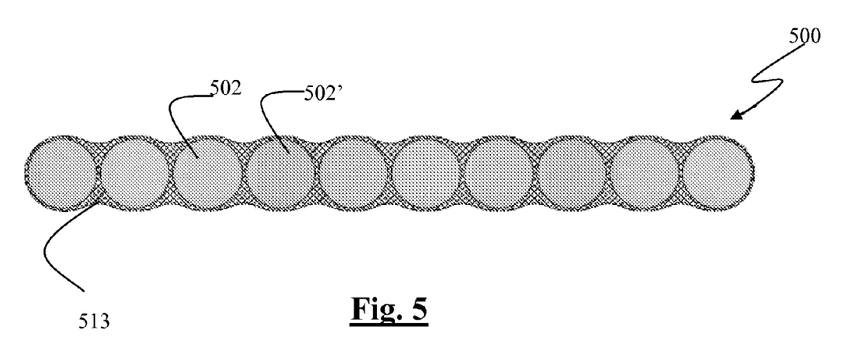
FIG. 5 shows a bottom view of an alternate form of a semi-assembled receiver tubes getter system according to the present invention.

FIG. 5 shows a bottom view of a semi-assembled getter system 500, made up of the containment metallic net 513 holding a line of getter pills 502, 502', . . . . In this case the containment metallic net 513 is also laterally wave-shaped so as to have a greater transverse size matching the pills diameter and a smaller transverse size that helps in restraining the movement of the getter pills. The top part of the sub-assembly (not visible) has a shape and configuration like the one illustrated, for example, in FIGS. 1A, 1B, 2A, 2B.

Figure 6:
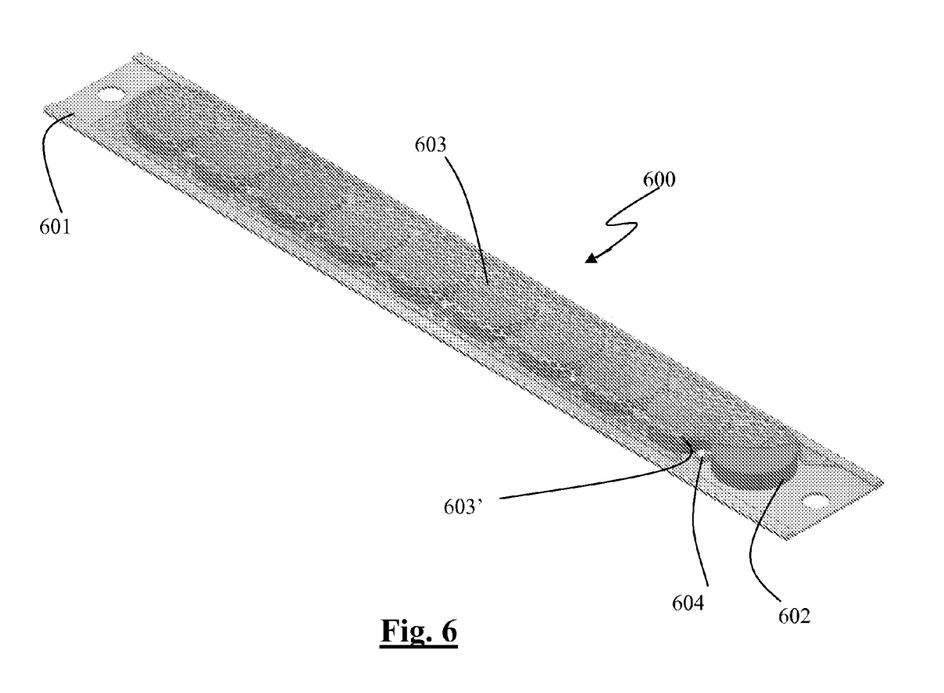
FIG. 6 shows a broken perspective view of a receiver tubes getter system according to the present invention.

Finally, for the sake of clarity, FIG. 6 shows in a broken perspective view a getter system 600 for solar collector receiver tubes according to the present invention, in particular the base 601, the first getter pill 602 of the getter pills line, the first of the base protrusions 604 and the highest portion 603' of the metallic containment mesh 603.

All the previous figures are non-limiting examples of the most interesting configurations and variants of receiver tubes getter systems according to the present invention.

For what pertains the characteristics of the metallic net used in the systems according to the present invention, they have holes, or more generically apertures, that have openings between 10 and 500 µm. Preferably the metallic net openings are comprised between 20 and 300 µm. In case the openings are not circular or roughly circular, the above size refers to their longest dimension. The metallic meshes may be seen as a series of intermeshing wires, these wires having preferably a diameter comprised between 0.05 and 0.30 mm.

Materials particularly suitable to be used for making the metallic meshes for receiver tubes getter systems according to the present invention are nickel-based alloys, AISI 304 or AISI 316 stainless steel, titanium, nickel and nickel-plated iron. These materials are the ones having the best shape retention properties after being pre-formed according to the requirements of the present invention, when used in the form of meshes with the above-described characteristics.

The getter materials preferred for the getter pills are the ones that exhibit a good hydrogen sorption capacity even when used at high temperatures.

Therefore preferred getter materials useful for the present invention are the ones described in U.S. Pat. No. 3,203,901 (Zr—Al alloys), U.S. Pat. No. 4,306,887 (Zr—Fe alloys), GB patent 2077487 (Zr—V—Fe alloys), U.S. Pat. No. 5,961,750 (Zr—Co-Rare earths alloy). For hydrogen sorption, particularly at high temperatures, it is also known the use of yttrium alloys, as described in the international patent applications WO 2007/148362, WO 2007/099575 and WO 2010/105945. The above-mentioned getter alloys are the ones preferably used with the present invention, but any hydrogen getter material may be employed with the inventive concept disclosed. Moreover it is possible to envision the use of pills made with a plurality of different getter materials or to load the system with different types of pills.

The invention claimed is:

1. A solar collector receiver tube containing one or more getter systems each comprising:
   a base,
   pills of getter materials arranged on said base in one or more lines, and
   a containment metallic mesh fixed onto the base and enclosing the getter pills,
   wherein said getter pills are uniform in height and comprised between 1 mm and 10 mm, preferably between 2 mm and 6 mm, said containment metallic mesh has a non-uniform height and presents at least one depression defined by a minimum and a maximum height of the metallic containment mesh, and
   wherein the minimum height of the metallic containment mesh is equal to the height of the getter pills and the maximum height is comprised between 1.05 and 2 times the height of the getter pills, preferably between 1.2 and 1.5 times the height of the getter pills.

2. The solar collector receiver tube containing one or more getter systems according to claim 1, wherein the diameter of the getter pills is comprised between 15 mm and 35 mm, preferably between 18 mm and 25 mm, and their diameter/height ratio is comprised between 2 and 8, preferably between 3 and 6.

3. The solar collector receiver tube containing one or more getter systems according to claim 1, wherein said base is provided with protrusions for spacing the getter pills.

4. The solar collector receiver tube containing one or more getter systems according to claim 1, wherein the containment metallic mesh is laterally wave-shaped so as to have a greater transverse size matching the pills diameter and a smaller transverse size in the portion between adjacent pills.

5. The solar collector receiver tube containing one or more getter systems according to claim 1, wherein the containment metallic mesh has openings comprised between 10 μm and 500 μm, preferably between 20 μm and 300 μm.

6. The solar collector receiver tube containing one or more getter systems according to claim 1, wherein the containment metallic mesh is formed by a series of intermeshing wires having a diameter comprised between 0.05 and 0.3 mm.

7. The solar collector receiver tube containing one or more getter systems according to claim 1, wherein the containment metallic mesh is made with a material chosen from nickel-based alloys, AISI 304 or AISI 316 stainless steel, titanium, nickel, nickel-plated iron.

8. A method for making the solar collector receiver tube containing one or more getter systems according to claim 1, wherein the method includes the steps of placing the getter pills either in a pre-formed metallic containment mesh or onto the getter system base and then joining said metallic containment mesh to said getter system base.

* * * * *